US009249058B2

(12) United States Patent
Yamashita et al.

(10) Patent No.: US 9,249,058 B2
(45) Date of Patent: *Feb. 2, 2016

(54) HIGH-STRENGTH TRANSPARENT ZIRCONIA SINTERED BODY, PROCESS FOR PRODUCING THE SAME, AND USES THEREOF

(71) Applicants: Isao Yamashita, Kanagawa (JP); Masayuki Kudou, Kanagawa (JP); Koji Tsukuma, Kanagawa (JP)

(72) Inventors: Isao Yamashita, Kanagawa (JP); Masayuki Kudou, Kanagawa (JP); Koji Tsukuma, Kanagawa (JP)

(73) Assignee: TOSOH CORPORATION, Yamaguchi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/168,651

(22) Filed: Jan. 30, 2014

(65) Prior Publication Data

US 2014/0145125 A1 May 29, 2014

Related U.S. Application Data

(63) Continuation of application No. 13/320,441, filed as application No. PCT/JP2010/059408 on Jun. 3, 2010, now Pat. No. 8,722,555.

(30) Foreign Application Priority Data

Jun. 4, 2009 (JP) .................. 2009-134741
Oct. 16, 2009 (JP) .................. 2009-239627

(51) Int. Cl.
*C04B 35/49* (2006.01)
*G02B 1/02* (2006.01)
(Continued)

(52) U.S. Cl.
CPC ................. *C04B 35/49* (2013.01); *B82Y 30/00* (2013.01); *C04B 35/6455* (2013.01); *G02B 1/02* (2013.01);
(Continued)

(58) Field of Classification Search
CPC .................. C04B 35/49; C04B 35/486; C04B 2235/3246; C04B 2235/9653; G02B 1/02
See application file for complete search history.

(56) References Cited

U.S. PATENT DOCUMENTS 4,758,541 A 7/1988 Tsukuma
4,915,625 A 4/1990 Tsukuma et al.
(Continued)

FOREIGN PATENT DOCUMENTS

CN 1526683 9/2004
CN 101097262 1/2008
(Continued)

OTHER PUBLICATIONS

Chinese Office Action dated May 7, 2014 from patent family member Chinese Patent Application No. 2010-80024454.2 with English translation thereof.
(Continued)

*Primary Examiner* — Karl Group
(74) *Attorney, Agent, or Firm* — Greenblum & Bernstein, P.L.C.

(57) ABSTRACT

Translucent zirconia sintered bodies have had a problem that incorporation of titania improves translucency but lowers mechanical strength. The invention provides: a zirconia sintered body containing titanium oxide, the sintered body containing 6-15 mol % yttria and 3-20 mol % titania and having an in-line transmission of 50% or higher when examined at a sample thickness of 1 mm and a measuring wavelength of 600 nm; and a zirconia sintered body having especially high translucency which is a high-quality transparent zirconia sintered body that contains 3-20 mol % titania and 6-15 mol % yttria and has an in-line transmission, as measured at a wavelength of 600 nm, of 73% or higher and a haze value of 2.0% or less and that is highly translucent and is undimmed (cloudless). The invention further relates to a production process in which a powder having the composition is molded and thereafter subjected to ordinary-pressure primary sintering and hot isostatic pressing (HIP) under specific conditions.

5 Claims, 4 Drawing Sheets

(51) Int. Cl.
*C04B 35/645* (2006.01)
*B82Y 30/00* (2011.01)

(52) U.S. Cl.
CPC . *C04B 2235/3201* (2013.01); *C04B 2235/3217* (2013.01); *C04B 2235/3225* (2013.01); *C04B 2235/3232* (2013.01); *C04B 2235/3246* (2013.01); *C04B 2235/3272* (2013.01); *C04B 2235/549* (2013.01); *C04B 2235/5409* (2013.01); *C04B 2235/5454* (2013.01); *C04B 2235/656* (2013.01); *C04B 2235/6562* (2013.01); *C04B 2235/6567* (2013.01); *C04B 2235/663* (2013.01); *C04B 2235/72* (2013.01); *C04B 2235/762* (2013.01); *C04B 2235/77* (2013.01); *C04B 2235/786* (2013.01); *C04B 2235/79* (2013.01); *C04B 2235/96* (2013.01); *C04B 2235/9623* (2013.01); *C04B 2235/9646* (2013.01); *C04B 2235/9653* (2013.01); *C04B 2235/9661* (2013.01)

(56) References Cited

U.S. PATENT DOCUMENTS

| | | |
|---|---|---|
| 7,291,574 B2 | 11/2007 | Tanaka et al. |
| 7,324,285 B2 | 1/2008 | Reichel et al. |
| 7,538,055 B2 | 5/2009 | Tsukuma et al. |
| 2004/0192535 A1 | 9/2004 | Tanaka et al. |
| 2007/0127140 A1 | 6/2007 | Reichel et al. |
| 2007/0197368 A1 | 8/2007 | Tsukuma et al. |

FOREIGN PATENT DOCUMENTS

| | | |
|---|---|---|
| DE | 102009030951 A1 | 1/2010 |
| EP | 0206780 A2 | 12/1986 |
| EP | 0206780 A3 | 12/1986 |
| EP | 0279102 A2 | 8/1988 |
| EP | 0279102 A3 | 8/1988 |
| EP | 0297908 A1 | 4/1989 |
| EP | 2 045 222 A1 | 4/2009 |
| JP | 62-91467 | 4/1987 |
| JP | 01-113038 | 5/1989 |
| JP | 01-126267 | 5/1989 |
| JP | 01-172264 | 7/1989 |
| JP | 2-199059 | 8/1990 |
| JP | 3-150263 | 6/1991 |
| JP | 2569622 | 1/1997 |
| JP | 2569662 | 1/1997 |
| JP | 2007-246384 | 9/2007 |
| JP | 2008-222450 | 9/2008 |

OTHER PUBLICATIONS

Japanese Office Action dated Apr. 1, 2014 from JP Application No. 2010-101403 and English translation thereof.
Chinese Office Action dated Nov. 14, 2014 from patent family member Chinese Patent Application No. 2010-80024454.2 with English translation thereof.
U.S. Appl. No. 13/380,190 to Masahiro Watanabe et al., which was filed on Dec. 22, 2011.
Peuchert et al., "Transparent cubic-ZrO2 ceramics for applications as optical lenses", Journal of the European Ceramics Society 29, 2009, pp. 283-291.
Shigeyuki Somiya et al., Jiruconia Seramikkusu, 8, 1986, pp. 11-20.
Mendelson, "Average Grain Size in Polycrystalline Ceramics", Journal of the American Ceramic Society, vol. 52, No. 8, 1969, pp. 443-446.
Search report from International Application No. PCT/JP2010/059408, mail date is Aug. 3, 2010.
International Preliminary Report on Patentability for International Application No. PCT/JP2010/059408, mail date is Aug. 3, 2010.
European Search Report dated Jun. 18, 2013 for patent family member 10783426.9.
Tsukuma, Koji, "Transparent titania-yttria-zirconia ceramics," Journal of Materials Science Letters, vol. 5, No. 11, pp. 1143-1144 (1986).
China Office action, dated Aug. 28, 2013 from patent family member Chinese Appln. No. 2010800244542 along with an English translation thereof.
Japan Office action (Information Offer Form), dated Oct. 22, 2013 along with an English translation thereof.
Japan Office action, dated Nov. 19, 2013 along with an English translation thereof.
Japan Office action, dated Nov. 5, 2013 along with an English translation thereof.

HIGH-STRENGTH TRANSPARENT ZIRCONIA SINTERED BODY, PROCESS FOR PRODUCING THE SAME, AND USES THEREOF

RELATED APPLICATIONS

The present application is a continuation of U.S. patent application Ser. No. 13/320,441, now U.S. Pat. No. 8,722,555, which is a 371 U.S. National Stage application of International Application No. PCT/JP2010/059408, filed Jun. 3, 2010, which claims priority to Japanese Application No. 2009-134741, filed Jun. 4, 2009, and Japanese Application No. 2009-239627, filed Oct. 16, 2009, all of the disclosures of which are each hereby incorporated herein by reference in their entireties.

TECHNICAL FIELD

The present invention relates to a titania-containing transparent zirconia sintered body which is transparent and has excellent mechanical strength and which can be used as parts for watches, decorative members, exterior parts for electronic appliances, aesthetic dental parts, etc.

BACKGROUND ART

Transparent zirconia sintered bodies have a high refractive index and a high permittivity and hence are expected to be utilized as optical members (patent document 1). In particular, transparent zirconia sintered bodies to which titania has been added have a high transmission and, hence, application thereof to optical lenses and the like is being investigated enthusiastically (non-patent document 1 and patent document 2).

Furthermore, application of zirconia sintered bodies to aesthetic dental parts and the like is being investigated (patent documents 3 and 4), and application thereof to decorative parts and exterior parts is being investigated recently. There hence is a need for a titania-containing zirconia sintered body which has high mechanical strength besides translucency. However, the conventional titania-containing transparent zirconia is insufficient in mechanical strength although translucent.

In patent document 2, for example, a zirconia sintered body which, when examined at a sample thickness of 0.8 mm and a measuring wavelength of 600 nm, has an in-line transmission of 65% has been reported. This zirconia sintered body, however, has a grain size as large as about 100 μm and has low mechanical strength. Non-patent document 2 discloses a titania-containing transparent zirconia sintered body having a grain size of 200 μm, but the mechanical strength (bending strength) thereof is as low as about 210 MPa.

As described above, neither a titania-containing zirconia sintered body which combines mechanical strength and high translucency nor a process for producing the sintered body has been known.

Meanwhile, in the case where a zirconia sintered body is to be used in optical material applications, the sintered body is required to have a low transmission loss and exceedingly high transparency.

The transparent zirconia sintered bodies which have been reported so far include a transparent zirconia sintered body which contains 6 mol % or more yttria and 3 mol % or more titania and has an in-line transmission of 66% (sample thickness, 1 mm; measuring wavelength, 600 nm) and a transparent zirconia sintered body which contains 7.2 mol % yttria and 10 mol % titania and has an in-line transmission of 72% (sample thickness, 1 mm) (patent documents 2, 4, and 5 and non-patent document 1).

Furthermore, zirconia sintered bodies which contain 6-15 mol % yttria and have an in-line transmission of 73% (sample thickness, 1 mm; measuring wavelength, 550 nm) have been reported (patent document 1).

However, those sintered bodies are dimmed, i.e., so-called cloudy sintered bodies, although having some degree of translucency, and higher transparency has been necessary for optical applications.

Moreover, in the production process disclosed in the cited document 1, the production atmosphere is regulated on the basis of a method for disposing the sample vessel. It has hence been necessary that the atmosphere should be stably regulated in high-temperature HIP, which is accompanied with a deformation of the vessel, etc.

As described above, there has been neither a zirconia sintered body which has high translucency and undimmed high transparency nor a process for zirconia sintered body production which can yield such sintered body with satisfactory reproducibility.

PRIOR-ART DOCUMENTS

Patent Documents

Patent Document 1: JP-A-2007-246384
Patent Document 2: JP-A-62-91467
Patent Document 3: JP-A-01-113038
Patent Document 4: JP-A-01-172264
Patent Document 5: JP-A-01-126267

Non-Patent Document

Non-Patent Document 1: *Journal of the European Ceramics Society*, 29 (2009) 283-291.
Non-Patent Document 2: *Jiruconia Seramikkusu*, 8, SOMIYA Shigeyuki and YOSHIMURA Masahiro ed., Uchida Rokakuho, p. 19, 1986.

SUMMARY OF THE INVENTION

Problem that the Invention is to Solve

A titania-containing zirconia sintered body having excellent translucency and mechanical strength is provided.

Means for Solving the Problem

The present inventors diligently made investigations in order to obtain a zirconia sintered body containing both titania and yttria and having the strength and transparency which are required of transparent members such as, e.g., decorative members. As a result, the inventors have found that a zirconia sintered body which has an in-line transmission of 50% or higher when examined at a sample thickness of 1 mm and a measuring wavelength of 600 nm is obtained by configuring the sintered body so as to contain yttria in an amount of 6-15 mol % and titania in an amount of 3-20 mol %. The invention has been thus completed.

Essential points of the invention reside in the following (1) to (16).

(1) A zirconia sintered body characterized by containing yttria in an amount of 6-15 mol % and titania in an amount of 3-20 mol % and by having an in-line transmission of 50% or higher when examined at a sample thickness of 1 mm and a measuring wavelength of 600 nm.

(2) The zirconia sintered body according to (1) above preferably characterized by having an average grain size of less than 30 μm.

(3) The zirconia sintered body according to (2) above preferably characterized by having an average bending strength of 250 MPa or higher.

(4) The zirconia sintered body according to (2) above preferably characterized by having a sinter density of 99.9% or higher.

(5) The zirconia sintered body according to (2) above preferably characterized by having a crystalline phase, the crystalline phase having a cubic fluorite structure.

(6) The zirconia sintered body according to (1) above which preferably has an in-line transmission of 73% or higher when examined at a sample thickness of 1 mm and a measuring wavelength of 600 nm, and further has a haze value of 2.0% or less.

(7) The zirconia sintered body according to (1) above preferably characterized by having an average grain size of 30-60 μm.

(8) The zirconia sintered body according to (7) above preferably characterized by having a brightness L* of 84-90.

(9) The zirconia sintered body according to (7) above preferably characterized by having a color hue in which a* is −1.5 to 0.2 and b* is 0.0 to 4.0.

(10) A process for producing a zirconia sintered body containing 3-20 mol % titania and 6-15 mol % yttria, characterized by molding a zirconia powder which contains 3-20 mol % titania and 6-15 mol % yttria, subjecting the resultant compact to primary sintering at ordinary pressure and then to hot isostatic pressing (HIP) to obtain a sintered body having a ratio of reduced Ti of 20% or higher, and annealing the sintered body.

(11) The process for producing a zirconia sintered body according to (10) above preferably characterized in that the sintered body obtained by the primary sintering has a relative density of 94% or higher and an average grain size of 3 μm or less and this sintered body is subjected to HIP.

(12) The process for producing a zirconia sintered body according to (10) above preferably characterized in that the sintered body obtained through sintering at 1,200-1,400° C. is subjected to HIP.

(13) The process for producing a zirconia sintered body according to (10) above preferably characterized in that the HIP is conducted at 1,400-1,800° C.

(14) An optical part which comprises the zirconia sintered body according to (1) above.

(15) The optical part according to (14) above which preferably is for use as an optical lens.

(16) An exterior part for electronic appliances which comprises the zirconia sintered body according to (1) above.

Effects of the Invention

The zirconia sintered body of the invention has high translucency with an in-line transmission of 50% or higher (sample thickness, 1 mm; measuring wavelength, 600 nm). It is preferred that the zirconia sintered body should further have high mechanical strength with an average bending strength of 250 MPa or higher.

In the invention, the zirconia sintered body which has especially high translucency is undimmed (cloudless) and has high-quality transparency that includes an in-line transmission of 73% or higher (sample thickness, 1 mm; measuring wavelength, 600 nm) and a haze value of 2.0% or less. This zirconia sintered body is far higher in refractive index and permittivity and has the infrared transmission at longer wavelengths, as compared with transparent materials such as glasses and plastics. Furthermore, the zirconia sintered body has excellent mechanical properties, such as hardness, bending strength, and fracture toughness.

MODES FOR CARRYING OUT THE INVENTION

The zirconia sintered body of the invention is explained below.

The zirconia sintered body of the invention contains yttria ($Y_2O_3$) in an amount of 6-15 mol %, preferably 8-12 mol %. By regulating the yttria content thereof so as to be within that range, the crystalline phase of the zirconia sintered body can be made to be constituted of a cubic fluorite structure only. In the case where the yttria content thereof is less than 6 mol %, this sintered body contains tetragonal crystals intermingled with cubic crystals. On the other hand, in the case where the yttria content thereof exceeds 15 mol %, a crystalline phase which is not cubic, e.g., a pyrochlore-type oxide ($Y_2Ti_2O_7$), coexists, resulting in a decrease in translucency.

The zirconia sintered body of the invention contains titania ($TiO_2$) in an amount of 3-20 mol %, preferably 8-15 mol %. In the case where the titania content thereof is less than 3 mol %, sufficient translucency is not obtained. In the case where the titania content thereof exceeds 20 mol %, a compound phase, e.g., $ZrTiO_4$, coexists and this also results in a decrease in translucency.

It is preferred that the zirconia sintered body of the invention should contain both yttria and titania and that the yttria and the titania should be in the state of a solid solution thereof in the zirconia.

It is preferred that the zirconia sintered body of the invention should have a metal impurity content of 10 ppm or less. In the case where the metal impurity content thereof exceeds 10 ppm, this sintered body is apt to have a color. Examples of the metal impurities include metals other than Ti, Y, and Zr, and specifically include Al, Fe, and Mg.

With respect to the mechanical strength of the zirconia sintered body of the invention, the sintered body has an average bending strength of preferably 250 MPa or higher, more preferably 260 MPa or higher, even more preferably 280 MPa or higher, especially preferably 300 MPa or higher. In the case where the average bending strength thereof is less than 250 MPa, the zirconia sintered body is apt to be damaged.

When the zirconia sintered body of the invention is a zirconia sintered body which has especially high translucency, this sintered body has an average grain size of preferably 60 µm or less, more preferably 56 µm or less. With respect to the lower limit thereof, the average grain size is preferably 30 µm or more, more preferably 40 µm or more, even more preferably 45 µm or more.

Meanwhile, the zirconia sintered body which has especially high strength has an average grain size of preferably less than 30 µm, more preferably 25 µm or less, even more preferably 22 µm or less. There is no particular lower limit on the crystal grain size. However, from the standpoint of translucency, the average grain size thereof is preferably 6 µm or more, more preferably 10 µm or more. By regulating the average grain size thereof so as to be less than 30 µm, high mechanical strength, in particular, high bending strength, is obtained.

The zirconia sintered body of the invention is a dense sintered body having no pores. The sinter density thereof is preferably 99.9% or higher, more preferably 99.99% or higher, even more preferably 99.998% or higher, in terms of relative density. Accordingly, the porosity of the zirconia sintered body is preferably 0.002 vol % or less, more preferably 0.001 vol % or less. In the case where the porosity thereof exceeds 0.002 vol %, this sintered body is apt to have a reduced in-line transmission.

It is preferred that the crystalline phase of the sintered body of the invention should be cubic crystals. More preferably, the crystalline phase has a cubic fluorite structure. Cubic crystals have no optical anisotropy. Consequently, by configuring a polycrystalline substance so that the individual crystals are cubic, a sintered body having enhanced translucency is obtained. In the case where a sintered body contains a crystalline phase having optical anisotropy, e.g., tetragonal crystals, this sintered body is apt to have a reduced in-line transmission.

The zirconia sintered body of the invention, when examined at a sample thickness of 1 mm and a measuring wavelength of 600 nm, has an in-line transmission of 50% or higher, preferably 60% or higher, more preferably 65% or higher, even more preferably 70% or higher. In the case where the in-line transmission thereof is less than 50%, this sintered body appears to be lowly translucent, resulting in a decrease in aesthetic properties.

The in-line transmission thereof, as measured at a sample thickness of 1 mm and a measuring wavelength of 600 nm, is more preferably 73% or higher, especially preferably 73.5% or higher.

In-line transmission is a parameter having the following relational expression.

$$Ti = Tt - Td \quad (1)$$

Tt: total forward transmission (%)
Td: diffuse transmission (%)
Ti: in-line transmission (%)

In the case of the zirconia having especially high translucency, the haze value thereof as measured at a sample thickness of 1 mm is preferably 2.0% or less, more preferably 1.0% or less. In the case where the haze value thereof exceeds 2.0%, this sintered body is cloudy and is difficult to use in optical material applications. On the other hand, the smaller the haze values, the more the sintered body is preferred. However, so long as the zirconia sintered body has a haze value of 2.0% or less, this sintered body has transparency that renders the sintered body sufficiently usable in optical material applications.

Haze value H (%) can be determined using the following relational expression.

$$H = 100 \times Td/Tt \quad (2)$$

H: haze value (%)
Tt: total forward transmission (%)
Td: diffuse transmission (%)

It is preferred that the zirconia sintered body of the invention should have no striae. In the case where striae have generated, light scattering due to a difference in refractive index occurs and this is apt to result in a decrease in translucency.

It is preferred that the sintered body of the invention should have a diffusion coefficient κ, as measured at a measuring wavelength of 600 nm, of 0.15 cm$^{-1}$ or less. Diffusion coefficient can be determined using either of the following expressions (3) and (3)'.

$$\kappa = -\log(1-H)/d \quad (3)$$

$$\kappa = -\log(Ti/Tt)/d \quad (3)'$$

κ: diffusion coefficient (cm$^{-1}$)
H: haze value (%)
Ti: in-line transmission (%)
Tt: total forward transmission (%)
d: sample thickness (cm)

The higher the haze value, the higher the diffusion coefficient. For example, when the haze value is 2.0% or less, the diffusion constant at a measuring wavelength of 600 nm which is determined using expression (3) is 0.15 cm$^{-1}$ or less.

It is preferred that the sintered body which has an in-line transmission of 73% or higher when examined at a sample thickness of 1 mm and a measuring wavelength of 600 nm and which has a haze value of 2.0% or less should have an average grain size of 30-60 µm.

It is preferred that the sintered body of the invention should have a brightness L* of 84-90. The sintered body which has a brightness regulated so as to be within that range gives an improved sense of transparency. In the case where the L* thereof is less than 84, this brightness is too low, resulting in a decrease in the sense of transparency.

When the sintered body has a color hue in which a* is −1.5 to 0.2 and b* is 0.0-4.0, this sintered body gives no sense of coloration. Especially when the sintered body has a color hue in which b* exceeds 4.0, this sintered body is apt to have a light yellow tint.

By regulating the brightness and the color hue so as to satisfy L*=84 to 90, a*=−1.5 to 0.2, and b*=0.0 to 4.0, a sense of high-quality high transparency free from a sense of coloration is obtained.

A process for producing the zirconia sintered body of the invention is explained below.

The sintered body of the invention can be produced by subjecting a starting-material power including zirconia, yttria, and titania to molding and primary sintering and then subjecting the resultant primary sintered body to hot isostatic pressing (HIP) and annealing.

In the production process of the invention, a powder including zirconia, yttria, and titania is used as a starting-material powder.

The starting-material powder is not particularly limited so long as the powder includes those ingredients in given amounts. However, it is industrially advantageous to use a mixed powder obtained by mixing a powder of zirconia which contains yttria in the state of a solid solution with a powder of titania.

It is preferred that the powder of zirconia containing yttria in the state of a solid solution, which is to be used in the mixed powder, should be a powder having a purity of 99.9% or higher and a specific surface area of 5-20 m²/g. Furthermore, the powder of zirconia containing yttria in the state of a solid solution preferably is a powder having an average crystallite size of 10-50 nm and an average secondary-particle size of 100-500 nm, and more preferably is a powder produced by a wet synthesis process, e.g., a hydrolysis process.

The titania powder to be used in the mixed powder preferably has a purity of 99.9% or higher and a specific surface area of 10-100 m²/g, and more preferably is a fine powder having a purity of 99.95% or higher, an average crystallite size of 30 nm or less, and an average secondary-particle size of 500 nm or less. Even more preferred is a powder produced by a sulfuric acid process or a vapor-phase pyrolytic process.

When the zirconia powder and the titania powder are mixed together, methods for the mixing are not particularly limited so long as the two compounds are evenly dispersed. However, wet mixing by means of a wet ball mill, wet stirring mill, or the like is preferred because the ingredients can be more evenly mixed.

It is preferred that the starting-material powder should have a low metal impurity content. For example, the content of $Fe_2O_3$ therein is preferably 10 ppm or less. In the case where the $Fe_2O_3$ content exceeds 10 ppm, this raw-material powder gives a yellow zirconia sintered body.

In the production process of the invention, the starting-material powder is molded to obtain a compact to be subjected to primary sintering.

Methods for molding the starting-material powder are not limited so long as the molding yields a compact having a shape suitable for primary sintering. Use can be made of molding techniques which are generally used for molding ceramics, such as press molding, cold isostatic press molding, cast molding, extrusion molding, and injection molding.

In the production process of the invention, the compact is subjected to primary sintering to produce a primary sintered body to be subjected to HIP.

It is preferred that the primary sintered body should have a relative density of 90% or higher. In the case where the relative density thereof is less than 90%, it is impossible to completely remove the pores in HIP and the resultant zirconia sintered body hence is apt to have an insufficient density and reduced translucency.

In the case where a zirconia sintered body having especially high translucency is to be obtained, it is preferred that the primary sintered body should have a relative density of 94% or higher. In the case where the relative density of the primary sintered body is less than 94%, this sintered body has open pores and the HIP gas infiltrates into the sintered body, resulting in no increase in density and a decrease in transmission.

The primary sintered body has an average sintered-grain of preferably 10 μm or less, more preferably 3 μm or less, even more preferably 2 μm or less. The translucency of the zirconia sintered body of the invention considerably depends on the structure of the primary sintered body. In the case where the average sintered-grain of the primary sintered body exceeds 10 μm, pores are apt to remain in the grain size of the primary sintered body and are less apt to be removed even through HIP. On the other hand, when the average sintered-grain size is 10 μm or less, all the pores in this primary sintered body are present at the boundaries of the sintered grain size and are sufficiently removed through HIP. In addition, when the average grain size is 10 μm or less, plastic flows of the sintered grains are apt to occur during HIP and this is thought to be a cause which facilitates efficient removal of the pores. When the average grain size is 3 μm or less, that effect is apt to be enhanced remarkably.

The transparency of the zirconia sintered body of the invention considerably depends on the structure of the primary sintered body, in particular, on the state in which the pores contained in the sintered body are present. With respect to the state in which the pores contained in the primary sintered body are present, it is thought that the pores are present in two states, i.e., intergranular pores and intragranular pores. It is especially preferred that the primary sintered body should contain no intragranular pores. Even when pores are present in the primary sintered body, these pores are apt to be eliminated by HIP so long as the pores are intergranular pores present at the boundaries of the crystal grains of the primary sintered body. Such pores exert a limited influence on the transparency of the sintered body to be finally obtained.

It is preferred that the primary sintered body should have a mixed crystalline phase including a cubic phase and a tetragonal phase. By disposing grains so as to adjoin grains differing therefrom in crystal system, the primary sintered body is inhibited from undergoing grain growth and intragranular pores are rendered less apt to generate. In addition, grain growth in HIP is apt to be inhibited.

The sintering temperature in the primary sintering is preferably 1,200-1,400° C., more preferably 1,250-1,400° C., even more preferably 1,300-1,375° C. Through sintering conducted at a temperature within such a range, a sinter density and an average sintered-grain size which are within the respective ranges shown above are obtained.

In the case where a zirconia sintered body having especially high translucency is to be obtained, the sintering temperature in the primary sintering is regulated so as to be lower than the HIP temperature, and is preferably 1,200-1,400° C., more preferably 1,250-1,400° C., even more preferably 1,300-1,400° C. Thus, grain growth during the primary sintering can be inhibited. It is preferred to use a heating rate of 100-300° C./hr.

Holding period in the primary sintering varies depending on sintering temperature and, hence, cannot be determined unconditionally. However, the holding period may be in the range of about 1-10 hours. For example, in the case where the sintering temperature is 1,300° C., the holding period is preferably about 10 hours. In the case where the sintering temperature is higher than that, the sintering can be carried out in a shorter period of 1-5 hours. Although the primary sintering can usually be conducted in the air, sintering in an atmosphere of oxygen, vacuum, or the like may be applied.

In the production process of the invention, the primary sintered body is subsequently subjected to HIP.

The HIP temperature is a temperature which is higher than the primary-sintering temperature and which is preferably higher than 1,250° C. but lower than 1,600° C., more preferably 1,275-1,550° C., even more preferably 1,300-1,500° C. In the case where the HIP temperature is 1,600° C. or higher, the sintered-grain size is apt to increase considerably, resulting in a decrease in strength. However, in the case where the HIP temperature is lower than 1,250° C., the crystalline phases of the primary sintered body which include cubic crystals intermingled with tetragonal crystals are not converted by the HIP to a crystalline phase constituted of cubic crystals only, and the zirconia sintered body thus obtained is apt to have reduced translucency.

In the case where a zirconia sintered body having especially high translucency is to be obtained, the HIP temperature is preferably 1,400-1,800° C., more preferably 1,550-1,800° C., even more preferably 1,600-1,700° C. By using a temperature of 1,400° C. or higher, the sintered body obtained has improved transparency. Temperatures of 1,550° C. and higher bring about further improved transparency. Although temperatures exceeding 1,800° C. can be applied, the resultant zirconia sintered body has an exceedingly increased grain size and hence has reduced strength.

In the production process of the invention, it is preferred that $Ti^{4+}$ contained in the titania component should be reduced during the primary sintering or the HIP or during these two steps. The higher the proportion of $Ti^{3+}$ in the Ti contained in the sintered body which is undergoing HIP (hereinafter referred to as ratio of reduced Ti), the higher the transparency of the zirconia sintered body of the invention. This effect is thought to be produced by the following mechanism.

When tetravalent titanium in the titania present as a solid solution in the zirconia is reduced to yield trivalent titanium, oxygen is released and oxygen deficiencies (□) are newly formed in the crystal lattice, according to formula (4).

$$Ti^{4+}O_2 \rightarrow Ti^{3+}O_{1.5}\square_{0.5} + 1/4 O_2 \uparrow \qquad (4)$$

The formation of oxygen deficiencies facilitates mass transfer within the crystal lattice and, hence, movement (elimination) of residual pores is accelerated.

Although the Ti reduction can be conducted in either the primary sintering or the HIP, it is preferred to conduct the reduction during the HIP.

The ratio of reduced Ti can be determined through calculation on the assumption that the difference in weight between the sintered body obtained through the HIP and the sintered body obtained through annealing (oxidation) is attributable to oxygen deficiencies of the titania. In the case where titania is not contained, a significant change in the weight of the sintered body through the annealing is not observed. It can hence be seen that the difference in weight between the sintered body obtained through the HIP and the sintered body obtained through annealing (oxidation), in the process of the invention, is due to the reduction of the titania. Furthermore, the formation of $Ti^{3+}$ by reduction and the oxidation by annealing can be ascertained from the fact that when the zirconia sintered body obtained through the HIP and the zirconia sintered body obtained through annealing are examined for ESR spectrum, a clear signal assigned to $Ti^{3+}$ (g=2.0) is observed only in the ESR spectrum of the sintered body obtained through the HIP (unannealed sintered body).

The ratio of reduced Ti in the process of the invention is preferably 20% or higher, more preferably 25% or higher. When the ratio of reduced Ti is 20% or higher, many oxygen deficiencies are formed and movement (elimination) of residual pores is accelerated. A highly transparent zirconia sintered body hence is obtained. Meanwhile, in the case where the ratio of reduced Ti is less than 20%, oxygen deficiencies are formed in a small amount and, hence, elimination of residual pores is less apt to proceed.

In the case where a zirconia sintered body which has especially high translucency is to be obtained, the ratio of reduced Ti is preferably 20% or higher, more preferably 30% or higher, even more preferably 40% or higher. In the case where the ratio of reduced Ti is less than 20%, a zirconia sintered body having reduced translucency is obtained.

In the case where Ti is to be reduced during the primary sintering or the HIP, this may be accomplished by conducting the primary sintering or the HIP in a reducing atmosphere. In particular, Ti reduction in the HIP can be conducted while utilizing carbon monoxide which is generated by the reaction of the oxygen contained in a slight amount in the HIP pressure medium, e.g., a non-oxidizing gas such as argon or nitrogen, with the carbon contained in the heater, insulating material, or the like of the HIP apparatus.

The material of the vessel (sample vessel) in which the primary sintered body is disposed in the HIP is not particularly limited. It is, however, preferred that the vessel should be made of a reducing material, e.g., carbon. This configuration further accelerates the Ti reduction.

According to the production process of the invention, a zirconia sintered body can be obtained by annealing the sintered body obtained through the HIP.

The sintered body which has been obtained through the HIP and which has a ratio of reduced Ti of 20% or higher has a black color. Consequently, this sintered body, as sintered, does not have sufficient transparency. According to the process of the invention, the sintered body can be converted to a zirconia sintered body which is highly transparent and is undimmed (cloudless), by oxidizing the sintered body by annealing.

It is preferred that in the annealing, the sintered body is held at a temperature of 1,000-1,200° C. and ordinary pressure for 1 hour or longer in the air or in an oxidizing atmosphere using oxygen.

EXAMPLES

The invention will be explained below in detail by reference to Examples and Comparative Examples. However, the invention should not be construed as being limited to the following Examples.

(Ratio of Reduced Ti)

The difference in weight between a sintered body obtained through HIP and a sintered body obtained through annealing was determined, and the $Ti^{3+}$ content (z) and the ratio of reduced Ti (z/y) were calculated from the determined weight decrease using the following formula (5).

$$Zr_{1-x-y}Y_xTi^{4+}{}_yO_{2-0.5x} \rightarrow Zr_{1-x-y}Y_xTi^{4+}{}_{y-z}Ti^{3+}{}_zO_{2-0.5x-0.5z} \qquad (5)$$

(Total Forward Transmission and In-Line Transmission)

Total forward transmission and in-line transmission were measured with a double-beam type spectrophotometer (Type V-650, manufactured by JASCO Corp.). The same test sample as that which was subjected to the haze value measurement was used. A deuterium lamp and a halogen lamp were used as light sources to examine the test sample while changing the wavelength over the range of 200-800 nm to measure the in-line transmission at each wavelength. The value measured at a wavelength of 600 nm was used as a representative value.

(Haze Value and Diffusion Coefficient)

A zirconia sintered body was cut into a thickness of 1 mm, and both surfaces thereof were mirror-polished to a surface roughness Ra of 0.02 μm or less. This polished piece was used as a test sample. Haze value was measured with a hazeometer (TC-HIII, manufactured by Tokyo Denshoku Co., Ltd.) by methods according to JIS K7105 "Testing Methods for Optical Properties of Plastics" and JIS K7136 "Plastics—Method of Determining Haze of Transparent Materials".

Diffusion Coefficient was calculated using expression (3).

$$\kappa = -\log(1-H)/d \qquad (3)$$

(Average Grain Size)

A primary sintered body and a sintered body obtained through HIP were ground to form planar surfaces, and the resultant planar surfaces were mirror-polished with abrasive diamond grains of 9 μm, 6 μm, and 1 μm. The polished surfaces were heat-etched and then examined with an SEM.

The heat etching was conducted by holding each test sample for 2 hours at a temperature lower by 50-100° C. than the HIP temperature. From an SEM image of each etched sintered body, the average grain size was determined using expression (6) in accordance with the method described in *J. Am. Ceram. Soc.*, 52 [8]443-6 (1969).

$$D=1.56L \quad (6)$$

In expression (6), D is average grain size (μm) and L is the average length (μm) of grains which traverse any straight line. The value of L was an average of 100 or more actually measured lengths.

(Brightness, Color Hue)

A test sample was obtained by cutting a zirconia sintered body into a thickness of 1 mm and mirror-polishing both surfaces thereof to a surface roughness Ra of 0.02 μm or less. A measurement was made with a precision type spectrophotometric colorimeter (TC-1500SX, manufactured by Tokyo Denshoku Co., Ltd.) in accordance with JIS K7105 "Testing Methods for Optical Properties of Plastics", Section 5.3 and Section 5.4. A normal standard white plate was placed on the back surface of the sample, and the light reflected from the sample was examined to determine brightness L* and color hue a* and b*.

As the zirconia powder was used either a zirconia powder containing 8 mol % yttria (TZ-8Y, manufactured by Tosoh Corp.) or a zirconia powder containing 10 mol % yttria (TZ-10Y, manufactured by Tosoh Corp.), both powders having been produced by a hydrolysis process. As the titania powder was used a high-purity titania powder (PT-401M, manufactured by Ishihara Sangyo Kaisha, Ltd.) produced by a sulfuric acid process.

(Primary Sintering)

The starting-material powder was compacted with a mold press at a pressure of 50 MPa and then further compacted with an apparatus for cold isostatic pressing at a pressure of 200 MPa to obtain a cylindrical compact having a diameter of 20 mm.

This compact was sintered in the air under the conditions of a heating rate of 100° C./hr, a sintering temperature of 1,325° C. or 1,350° C., and a sintering period of 2 hours. Thus, primary sintered bodies were obtained (samples Nos. 1 to 4). The composition, density, average grain size, and crystalline phase of each of the primary sintered bodies obtained are shown in Table 1.

The composition of samples Nos. 1 and 2 was $TiO_2:Y_2O_3:ZrO_2=0.1:0.072:0.828$, and that of samples Nos. 3 and 4 was $TiO_2:Y_2O_3:ZrO_2=0.1:0.09:0.81$, in terms of molar ratio.

The primary sintered bodies each had a relative density of 90% or higher and an average grain size of 2 μm or less and had a crystalline phase constituted of a mixture of cubic crystals and tetragonal crystals.

TABLE 1

| | Starting-material powder | | Primary-sintering conditions | | Density of primary sintered body g/cm³ (%) | Average grain size μm | Crystalline phase C: cubic crystals T: tetragonal crystals |
|---|---|---|---|---|---|---|---|
| Sample No. | $Y_2O_3$ mol % | $TiO_2$ mol % | Holding temperature ° C. | Holding period hr | | | |
| No. 1 | 7.2 | 10 | 1325 | 2 | 5.46 (93.2) | 1.1 | C + T |
| No. 2 | 7.2 | 10 | 1350 | 2 | 5.70 (97.3) | 1.2 | C + T |
| No. 3 | 9.0 | 10 | 1325 | 2 | 5.34 (91.4) | 1.6 | C + T |
| No. 4 | 9.0 | 10 | 1350 | 2 | 5.58 (95.6) | 1.8 | C + T |

(Bending Strength)

The bending strength of a zirconia sintered body was measured in accordance with JIS R1601. The measurement was made ten times, and the average thereof was taken as average bending strength.

(Examination of Refractive Index Distribution)

A schlieren image of a zirconia sintered body was examined as a refractive index distribution thereof. The examination of a schlieren image was made with a compact schlieren apparatus (SLM-10, manufactured by Mizojiri Optical Co., Ltd.).

Examples 1 to 7

Starting-Material Powder

Given amounts of a zirconia powder and a titania powder were weighed out and mixed together in an ethanol solvent by means of a ball mill for 72 hours using zirconia balls having a diameter of 10 mm. This mixture was dried. The powder thus prepared was used as a starting-material powder.

(HIP)

The primary sintered body of sample No. 1, 2, 3, or 4 was subjected to HIP under the conditions of a given HIP temperature of 1,400-1,500° C., a pressure of 150 MPa, and a holding period of 1 hour. As a pressure medium, argon gas having a purity of 99.9% was used. As the vessel in which the sample was disposed, use was made of a lidded vessel made of carbon.

All the HIP-treated sintered bodies obtained through the HIP had a black color. By annealing these sintered bodies in the air at 1,000° C. for 2 hours, zirconia sintered bodies having translucency were obtained.

The zirconia sintered bodies obtained each had a density of 100% when a tolerance range for the Archimedes method was taken into account, and the crystalline phase thereof was constituted only of fluorite type cubic crystals.

The ratio of reduced Ti after the HIP and the properties of each zirconia sintered body obtained through the annealing are shown in Table 2.

TABLE 2

| Example | Sample No. | HIP temperature °C. | Ratio of reduced Ti % | Properties of zirconia sintered body ||||| 
|---|---|---|---|---|---|---|---|---|
| | | | | In-line transmission % (600 nm) | Haze value % | Total forward transmission % (600 nm) | Average grain size μm | Bending strength MPa |
| 1 | No. 1 | 1500 | 42 | 71.6 | 2.7 | 74.4 | 15.1 | 285 |
| 2 | No. 2 | 1500 | 40 | 71.9 | 2.6 | 74.4 | 14.3 | 281 |
| 3 | No. 3 | 1500 | 45 | 70.1 | 4.5 | 73.2 | 20.9 | 296 |
| 4 | No. 4 | 1500 | 47 | 69.7 | 5.3 | 72.8 | 19.8 | 285 |
| 5 | No. 4 | 1450 | 38 | 66.9 | 8.9 | 72.5 | 16.2 | 294 |
| 6 | No. 3 | 1400 | 29 | 66.3 | 9.2 | 72.0 | 12.1 | 306 |
| 7 | No. 4 | 1400 | 29 | 61.2 | 15.6 | 71.9 | 11.0 | 309 |

Figure 1:
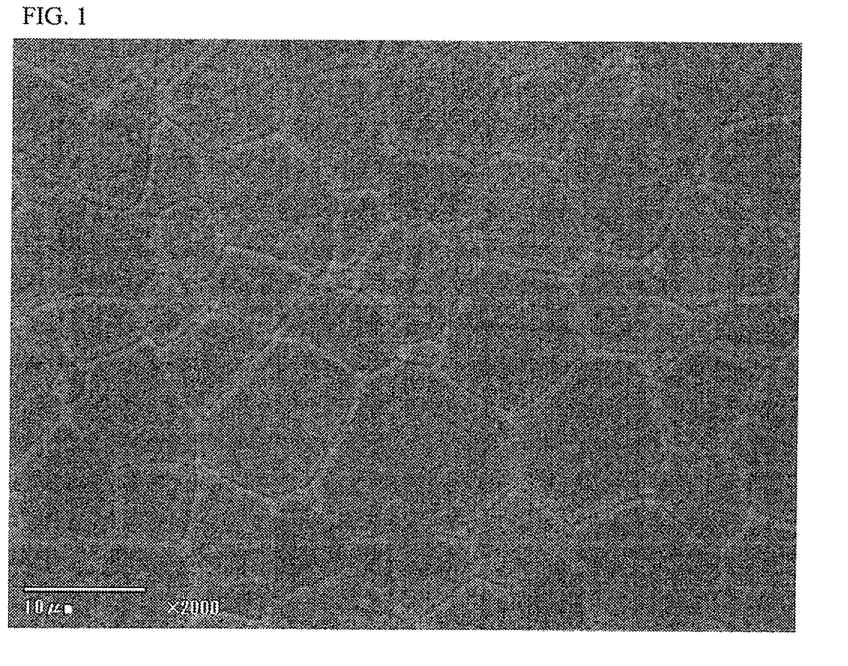
FIG. 1 shows the structure of a sintered body according to the invention (Example 6) (the scale in the figure is 10 μm).
Figure 2:
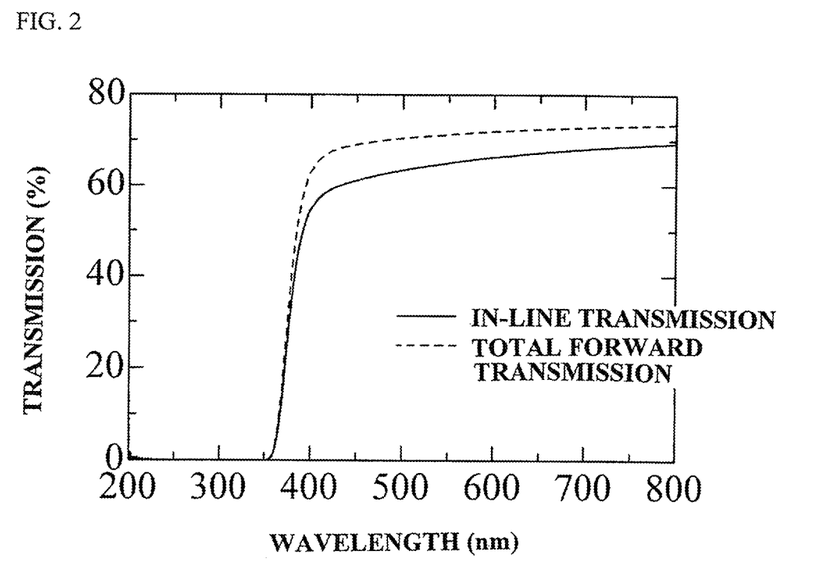
FIG. 2 is graphs showing transmissions of the sintered body according to the invention (Example 6).

Each zirconia sintered body had an in-line transmission as high as 60% or above and a bending strength as high as 250 MPa or above. These sintered bodies of the invention were configured of fine crystal grains as shown in FIG. 1.

Example 8

Figure 3:
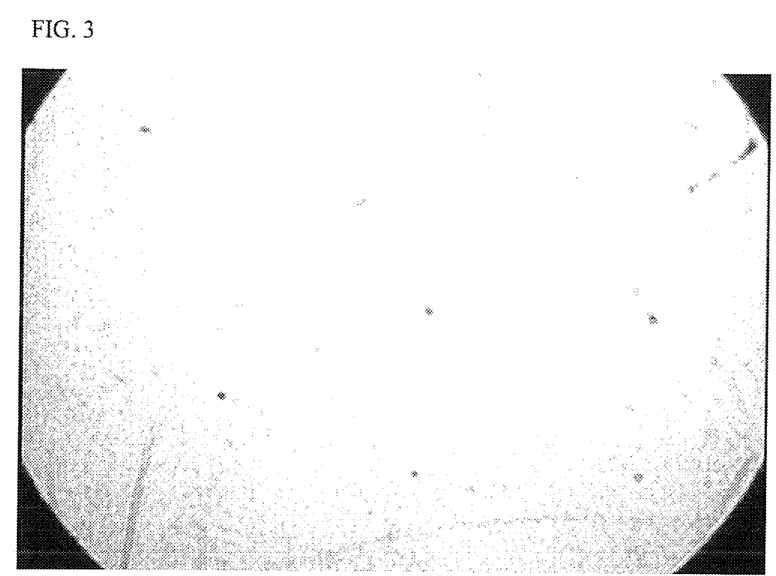
FIG. 3 shows a schlieren image of the sintered body according to the invention (Example 6).

The zirconia sintered body of Example 6 was examined for schlieren image. The schlieren image obtained is shown in FIG. 3. The zirconia sintered body was a homogeneous sintered body having no striae.

Example 9

The zirconia sintered body of Example 4 was examined for refractive index, Abbe number, relative permittivity, dielectric loss, and Vickers hardness. The refractive index was measured by a prism coupling method, and the relative permittivity and the dielectric loss were determined in the frequency range of 100-1,000 kHz. The Vickers hardness was measured under a load of 5 kg. The results thereof are shown in Table 3.

The values of refractive index and relative permittivity thereof were far higher than those of transparent materials such as glasses, and the values of dielectric loss thereof were exceedingly small.

TABLE 3

| Refractive index | 486 nm | 2.231 |
|---|---|---|
| | 589 nm | 2.214 |
| | 656 nm | 2.204 |
| Abbe number | | 44.2 |
| Relative permittivity | 100 kHz | 33.03 |
| | 500 kHz | 32.81 |
| | 1000 kHz | 32.70 |
| Dielectric loss | 100 kHz | 0.0056 |
| | 500 kHz | 0.0055 |
| | 1000 kHz | 0.0064 |
| Vickers hardness | | 1200 |

Comparative Examples 1 and 2

Using the primary sintered body of sample No. 2 or 4, a zirconia sintered body was produced under the same conditions as in Example 1, except that the HIP temperature was changed to 1,200° C. The results of evaluation of the zirconia sintered bodies obtained are shown in Table 4.

TABLE 4

| Comparative Example | Sample No. | HIP temperature °C. | Ratio of reduced Ti % | Properties of zirconia sintered body ||||| 
|---|---|---|---|---|---|---|---|---|
| | | | | In-line transmission % (600 nm) | Haze value % | Total forward transmission % (600 nm) | Average grain size μm | Bending strength MPa |
| 1 | No. 2 | 1200 | 6 | 0.2 | 97.5 | 36.0 | 4.3 | — |
| 2 | No. 4 | 1200 | 5 | 0.1 | 97.4 | 35.3 | 5.6 | — |

An HIP temperature of 1,200° C. resulted in an in-line transmission less than 1%. The reduction in HIP temperature resulted in considerable decreases in transmission.

The zirconia sintered bodies of these Comparative Examples each had two crystalline phases respectively constituted of cubic crystals and tetragonal crystals.

Comparative Example 3

Zirconia containing 9 mol % $Y_2O_3$ and 10 mol % $TiO_2$ was used to produce a primary sintered body (sample No. 5) under the conditions of a temperature of 1,500° C. and a sintering period of 2 hours. The results of evaluation of the primary sintered body obtained are shown in Table 5.

TABLE 5

| Sample No. | Starting-material powder Y$_2$O$_3$ mol % | TiO$_2$ mol % | Primary-sintering conditions Holding temperature °C. | Holding period hr | Density of primary sintered body g/cm$^3$ (%) | Average grain size μm | Crystalline phase C: cubic crystals T: tetragonal crystals |
|---|---|---|---|---|---|---|---|
| No. 5 | 9.0 | 10 | 1500 | 2 | 5.66 (96.9) | 21.0 | C |

The primary sintered body obtained had a crystalline phase constituted only of cubic crystals, and had an average grain size as large as 20 μm or above.

The primary sintered body obtained (sample No. 5) was treated under the same conditions as in Example 1 to produce a zirconia sintered body. The results are shown in Table 6.

TABLE 6

| Comparative Example | Sample No. | HIP temperature °C. | Ratio of reduced Ti % | Properties of zirconia sintered body In-line transmission % (600 nm) | Haze value % | Total forward transmission % (600 nm) | Average grain size μm | Bending strength MPa |
|---|---|---|---|---|---|---|---|---|
| 3 | No. 5 | 1500 | 41 | 45.8 | 24.7 | 61.6 | 43.5 | — |

The zirconia sintered body obtained from the primary sintered body in which the crystalline phase had been constituted of cubic crystals had low values of transmission after HIP.

Comparative Example 4

Figure 4:
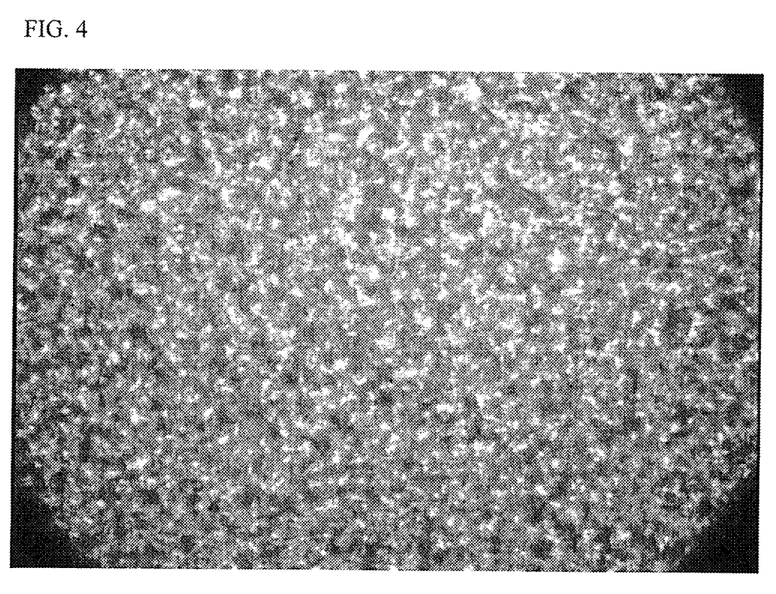
FIG. 4 shows a schlieren image of the sintered body of a Comparative Example (Comparative Example 4).

A zirconia sintered body was produced by conducting the same treatments as in Example 4, except that mixing of the starting-material powder was omitted. The results of evaluation of the zirconia sintered body obtained are shown in Table 7, and a schlieren image thereof is shown in FIG. 4.

Use of the unhomogeneous starting-material powder resulted in low values of transmission. In the schlieren image, many black spots attributable to ununiformity of the refractive index distribution were observed.

TABLE 7

| Comparative Example | Density of primary sintered body g/cm$^3$ (%) | Ratio of reduced Ti % | Properties of zirconia sintered body In-line transmission % (600 nm) | Total forward transmission % (600 nm) | Average grain size μm |
|---|---|---|---|---|---|
| 4 | 5.45 (93.3) | 49 | 21.5 | 50.1 | 18.1 |

Examples 10 to 21

Preparation of Starting-Material Powder

Given amounts of a zirconia powder and a titania powder were weighed out and mixed together in an ethanol solvent by means of a ball mill for 72 hours using zirconia balls having a diameter of 10 mm. This mixture was dried. The powder thus prepared was used as a starting-material powder.

As the zirconia powder was used either a zirconia powder containing 8 mol % yttria (TZ-8Y, manufactured by Tosoh Corp.) or a zirconia powder containing 10 mol % yttria (TZ-10Y, manufactured by Tosoh Corp.), both powders having been produced by a hydrolysis process. As the titania powder was used a high-purity titania powder (PT-401M, manufactured by Ishihara Sangyo Kaisha, Ltd.) produced by a sulfuric acid process. Properties of the zirconia powder and titania powder are shown in Table 8.

TABLE 8

| Powder | Product name | Specific surface area m$^2$/g | Crystallite size nm | Y$_2$O$_3$ wt % | Fe$_2$O$_3$ Ppm | Na$_2$O ppm | Al$_2$O$_3$ ppm | Remarks |
|---|---|---|---|---|---|---|---|---|
| Zirconia powder | TZ-8Y | 14 | 42 | 14.9 | 3.1 | 525 | 0 | |
| | TZ-10Y | 15 | 45 | 19.0 | 5.2 | 1084 | 0 | |
| Titania powder | PT-401M | 19 | 14 (rutile) 16 (anatase) | 0 | 27 | 22 | 5 | rutile, 52% |

(Primary Sintering)

The starting-material powder was compacted with a mold press at a pressure of 50 MPa and then further compacted with an apparatus for cold isostatic pressing at a pressure of 200 MPa to obtain a cylindrical compact having a diameter of 20 mm and a thickness of 2 mm.

Primary sintering was conducted in the air under the conditions of a heating rate of 100° C./hr, given primary-sintering temperatures of 1,300-1,375° C., and a sintering period of 2 hours or 10 hours. Thus, primary sintered bodies were obtained (samples Nos. 6 to 13).

The composition, density, average grain size, and crystalline phase of each of the primary sintered bodies obtained are shown in Table 9.

Each primary sintered body had a relative density of 94-98% and an average grain size of 3 μm or less and had two crystalline phases respectively constituted of cubic crystals and tetragonal crystals.

TABLE 9

| | Starting-material powder | | Primary-sintering conditions | | Density of primary | Average | Crystalline phase |
|---|---|---|---|---|---|---|---|
| Sample No. | $Y_2O_3$ mol % | $TiO_2$ mol % | Holding temperature °C. | Holding period hr | sintered body g/cm³ (%) | grain size μm | C: cubic crystals T: tetragonal crystals |
| No. 6 | 7.6 | 5 | 1350 | 2 | 5.77 (97.0) | 1.1 | C + T |
| No. 7 | 7.2 | 10 | 1300 | 10 | 5.54 (94.5) | 0.9 | C + T |
| No. 8 | 7.2 | 10 | 1375 | 2 | 5.73 (97.8) | 1.8 | C + T |
| No. 9 | 9.5 | 5 | 1350 | 2 | 5.75 (97.3) | 1.3 | C + T |
| No. 10 | 9.0 | 10 | 1300 | 10 | 5.47 (94.0) | 1.2 | C + T |
| No. 11 | 9.0 | 10 | 1375 | 2 | 5.60 (96.2) | 2.2 | C + T |
| No. 12 | 8.5 | 15 | 1300 | 10 | 5.41 (94.5) | 2.0 | C + T |
| No. 13 | 8.5 | 15 | 1375 | 2 | 5.59 (97.6) | 2.4 | C + T |

(HIP and Annealing)

Each of the primary sintered bodies of sample Nos. 6 to 13 was subjected to HIP under the conditions of a temperature of 1,650° C., a pressure of 150 MPa, and a holding period of 1 hour. As a pressure medium, argon gas having a purity of 99.9% was used.

As the vessel in which the sample was disposed, use was made of any of a lidded vessel made of carbon, a lidless vessel made of carbon, and a lidless vessel made of alumina.

All the zirconia sintered bodies obtained through the HIP had a black color, and hence were annealed in the air at 1,000° C. for 2 hours. All the zirconia sintered bodies thus obtained through the annealing were colorless and transparent.

The zirconia sintered bodies obtained each had a density of 100% when a tolerance range for the Archimedes method was taken into account, and the crystalline phase thereof was constituted only of fluorite type cubic crystals.

The ratios of Ti reduced through the HIP and the average grain size, haze value, in-line transmission, diffusion coefficient, brightness, and color hue of each zirconia sintered body obtained through the annealing are shown in Table 10.

Although all the zirconia sintered bodies underwent a weight decrease through the HIP, each sintered body increased in weight through the annealing and came to have the same weight as before the HIP.

Furthermore, the zirconia sintered bodies before and after the HIP and the zirconia sintered bodies obtained through the annealing were examined for ESR spectrum. As a result, a clear signal assigned to $Ti^{3+}$ (g=2.0) was observed only in the ESR spectra of the sintered bodies obtained through the HIP (unannealed sintered bodies). It was hence found that the $Ti^{3+}$ had been oxidized by the annealing.

TABLE 10

| | | | | | Properties of zirconia sintered body | | | | | | |
|---|---|---|---|---|---|---|---|---|---|---|---|
| | | Sample vessel | | Ratio of reduced | Haze value | In-line transmission | Diffusion coefficient | Brightness | Color Hue | Color Hue | Average grain |
| Example | Sample No. | Material | Lid | Ti % | % | % (600 nm) | cm⁻¹ | L* | a* | b* | size μm |
| 10 | No. 6 | alumina | absent | 32 | 1.0 | 73.0 | 0.1005 | 87.5 | −0.1 | 1.1 | 30.0 |
| 11 | No. 7 | alumina | absent | 30 | 0.8 | 73.1 | 0.0803 | 88.1 | 0.0 | 1.6 | 34.2 |
| 12 | No. 7 | carbon | absent | 70 | 0.3 | 73.9 | 0.0300 | 88.1 | −0.1 | 1.8 | 40.2 |
| 13 | No. 7 | carbon | present | 74 | 0.5 | 73.4 | 0.0501 | 87.8 | −0.2 | 1.5 | 41.5 |
| 14 | No. 8 | alumina | absent | 33 | 0.6 | 73.2 | 0.0602 | 87.3 | 0.1 | 0.9 | 46.4 |
| 15 | No. 9 | alumina | absent | 40 | 0.6 | 73.3 | 0.0602 | 87.4 | −0.1 | 1.2 | 32.5 |
| 16 | No. 10 | alumina | absent | 30 | 1.0 | 73.0 | 0.1005 | 87.0 | 0.0 | 1.1 | 47.3 |
| 17 | No. 10 | carbon | absent | 72 | 0.5 | 73.5 | 0.0501 | 88.2 | 0.1 | 1.2 | 51.2 |
| 18 | No. 10 | carbon | present | 77 | 0.3 | 74.0 | 0.0300 | 88.5 | −0.1 | 1.1 | 54.9 |
| 19 | No. 11 | alumina | absent | 35 | 0.4 | 73.5 | 0.0401 | 88.2 | −0.1 | 0.8 | 43.6 |
| 20 | No. 12 | alumina | absent | 34 | 1.0 | 73.0 | 0.1005 | 87.5 | 0.0 | 1.8 | 55.2 |
| 21 | No. 13 | alumina | absent | 39 | 0.9 | 73.0 | 0.0904 | 87.1 | −0.1 | 1.4 | 53.1 |

The zirconia sintered bodies each had an in-line transmission (sample thickness, 1 mm; measuring wavelength, 600 nm) of 73-74% and a haze value as low as 0.3-1.0%. All the zirconia sintered bodies had undimmed high transparency.

Examples 22 to 25

Preparation of Starting-Material Powder

A zirconia powder containing 8 mol % yttria (TZ-8Y, manufactured by Tosoh Corp.) was mixed with a titania powder produced by a vapor-phase process (Super Titania, manufactured by Showa Denko K. K.) by means of a ball mill to obtain a zirconia powder containing 7.2 mol % yttria and 10 mol % titania.

Properties of the titania powder used are shown in Table 11.

TABLE 11

| Powder | Product name | Specific surface area m²/g | Crystallite size nm | Y₂O₃ wt % | Fe₂O₃ ppm | Na₂O ppm | Al₂O₃ ppm | Remarks |
|---|---|---|---|---|---|---|---|---|
| Titania powder | Super Titania | 64 | 78 (rutile) 44 (anatase) | 0 | 11 | 2 | 2 | rutile, 3% |

(Primary Sintering)

The starting-material powder was compacted and subjected to primary sintering in the same manner as in Examples 19 to 21, except that in the primary sintering, the compact was held at 1,325° C. in the air for 2 hours. Thus, a primary sintered body was obtained (sample No. 14).

(HIP and Annealing)

Zirconia sintered bodies were obtained in the same manner as in Examples 19 to 21, except that the HIP temperature was changed to 1,600° C. or 1,700° C. The properties of the zirconia sintered bodies are shown in Table 12.

Comparative Example 5

The primary sintered bodies of sample No. 7 (7.2 mol % yttria and 10 mol % titania) and sample No. 10 (9.0 mol % yttria and 10 mol % titania) were subjected to HIP in completely the same manner as in Example 11, except that each primary sintered body was disposed in a lidded alumina vessel. Thus, zirconia sintered bodies were obtained.

The zirconia sintered body obtained from either of the two primary sintered bodies had a low ratio of reduced Ti. The sintered body obtained from sample No. 7 had a ratio of reduced Ti of 3%, and the sintered body obtained from sample No. 10 had a ratio of reduced Ti of 5%.

With respect to the in-line transmission of each sintered body, the sintered body obtained from sample No. 7 had an in-line transmission of 45%, and the sintered body obtained

TABLE 12

| | HIP tempera- | Sample vessel | | Ratio of reduced | Haze value | In-line transmission | Diffusion coefficient | Brightness | Color Hue | Color Hue |
|---|---|---|---|---|---|---|---|---|---|---|
| Example | ture | Material | Lid | Ti % | % | % (600 nm) | cm⁻¹ | L* | a* | b* |
| 22 | 1600 | carbon | present | 62 | 1.0 | 73.1 | 0.1005 | 87.4 | −0.1 | 1.2 |
| 23 | 1700 | carbon | present | 85 | 0.3 | 74.0 | 0.0300 | 88.1 | −0.1 | 0.8 |
| 24 | 1600 | alumina | absent | 27 | 1.0 | 72.9 | 0.1005 | 88.3 | −0.1 | 1.0 |
| 25 | 1700 | alumina | absent | 59 | 0.4 | 73.9 | 0.0401 | 87.3 | −0.1 | 1.8 |

Example 26

A zirconia sintered body containing 7.2 mol % yttria and 10 mol % titania was produced in the same manner as in Example 12. This sintered body was examined for refractive index, Abbe number, relative permittivity, three-point bending strength, and Vickers hardness. The results thereof are shown in Table 13.

The refractive index was measured by a prism coupling method, and the relative permittivity was determined in the frequency range of 100-1,000 kHz. The three-point bending strength was measured in accordance with JIS R1601, and the Vickers hardness was measured under a load of 5 kg.

The values of refractive index and relative permittivity thereof were far higher than those of transparent materials such as glasses, and the zirconia sintered body had excellent mechanical properties.

from sample No. 10 had an in-line transmission of 64%. With respect to haze value, the sintered body obtained from sample No. 7 had a haze value of 29%, and the sintered body obtained from sample No. 10 had a haze value of 11%. These sintered bodies each had a haze value of 10% or more and an in-line transmission of 65% or less and had low transparency. Furthermore, the sintered body obtained from sample No. 10 had a diffusion coefficient as high as 1.03 cm⁻¹.

Comparative Example 6

Compacts formed from the starting-material powder used in Examples 16 to 19 (9.0 mol % yttria and 10 mol % titania) were held for 2 hours at temperatures of 1,500° C. and 1,600° C., respectively, to obtain primary sintered bodies. With respect to the average grain size of each primary sintered body, the primary sintered body obtained through sintering at 1,500° C. (sample No. 15) had an average grain size of 15.0 μm, and the primary sintered body obtained through sintering at 1,600° C. (sample No. 16) had an average grain size of 30.3 μm.

The primary sintered bodies obtained were subjected to HIP in completely the same manner as in Example 18 to obtain zirconia sintered bodies. The zirconia sintered body obtained from sample No. 15 had an in-line transmission of 55%, and the zirconia sintered body obtained from sample No. 16 had an in-line transmission of 48%. With respect to haze value, the zirconia sintered body obtained from sample

TABLE 13

| Refractive index | 486 nm | 2.252 |
|---|---|---|
| | 589 nm | 2.226 |
| | 656 nm | 2.215 |
| Abbe number | | 32.9 |
| Relative permittivity | 100 kHz | 30.9 |
| | 500 kHz | 30.8 |
| | 1000 kHz | 30.8 |
| Average bending strength | | 255 MPa |
| Vickers hardness | | 1180 |

No. 15 had a haze Value of 20%, and the zirconia sintered body obtained from sample No. 16 had a haze value of 27%. Both sintered bodies had poor transparency.

Example 27 and Comparative Example 7

Figure 5A:
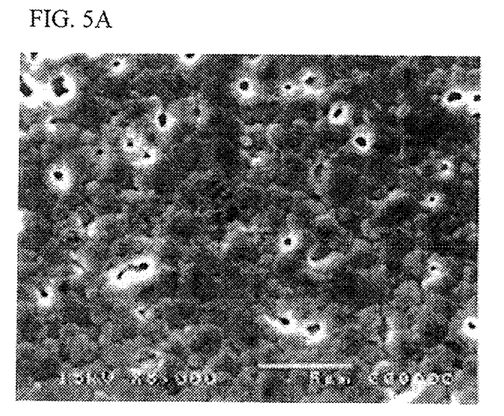
FIG. 5A shows the results of an SEM examination of the structure of a primary sintered body (1,300° C., 10 hours) (zirconia containing 9 mol % yttria and 10 mol % titania) (the scale in the figure is 5 μm).
Figure 5B:
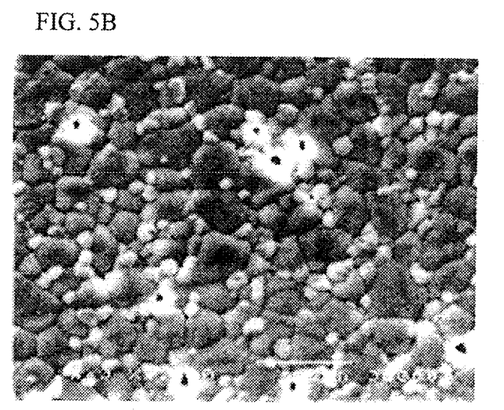
FIG. 5B shows the results of an SEM examination of the structure of a primary sintered body (1,400° C., 2 hours) (zirconia containing 9 mol % yttria and 10 mol % titania) (the scale in the figure is 5 μm).
Figure 5C:
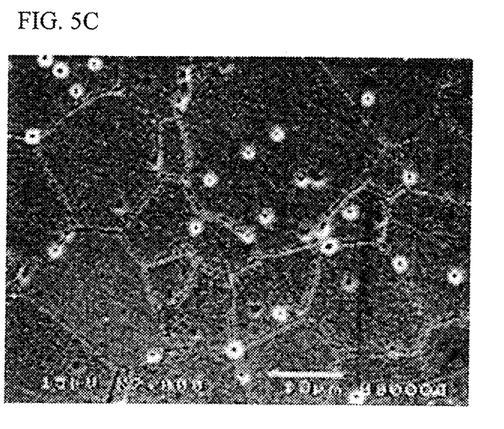
FIG. 5C shows the results of an SEM examination of the structure of a primary sintered body (1,500° C., 2 hours) (zirconia containing 9 mol % yttria and 10 mol % titania) (the scale in the figure is 10 μm).

Zirconia containing 9.0 mol % yttria and 10 mol % titania was examined for a difference in the structure of primary sintered body due to sintering temperature. The results of an SEM examination are shown in FIGS. 5A, 5B, and 5C. In the primary sintered body obtained through 10-hour holding at 1,300° C. (sample No. 10) and the primary sintered body obtained through 2-hour holding at 1,400° C., all the pores were present at the grain boundaries. In contrast, in the primary sintered body obtained through 2-hour holding at 1,500° C. (sample No. 15), there were a large number of pores which had been included in the grains. Furthermore, the crystalline phase of each sample was identified by XRD. As a result, in the primary sintered body obtained through sintering at 1,300° C. or 1,400° C. (Example 27), tetragonal crystals were observed besides cubic crystals. In contrast, in the primary sintered body obtained through sintering at 1,500° C. (Comparative Example 7), cubic crystals only were observed.

The transparency of sintered bodies obtained from sample No. 10 and sample No. 15 through HIP is as shown in Examples 16 to 18 and Comparative Example 6. The low transparency of the sintered body obtained from sample No. 15 was due to the fact that the intragranular pores included in large grains (FIG. 5C) were less apt to be eliminated by the HIP as compared with the intergranular pores (FIG. 5A).

Example 28

Figure 6:
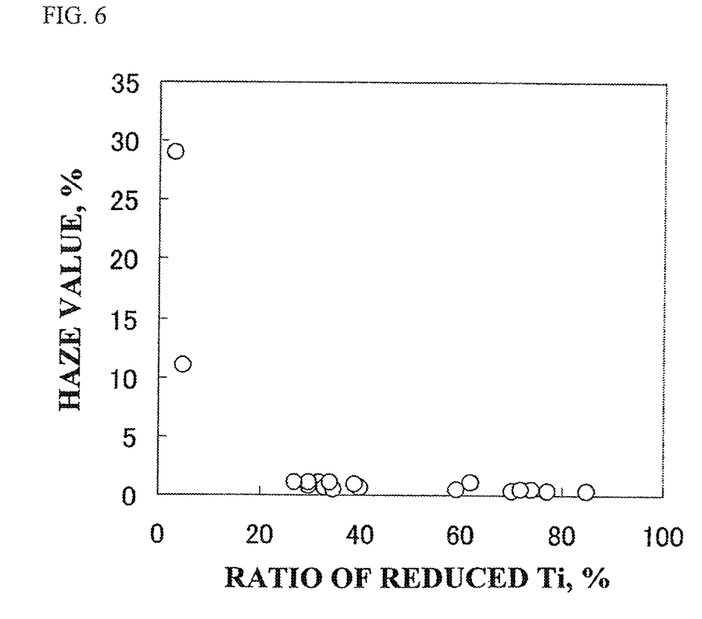
FIG. 6 is a graph showing a relationship between haze value and the ratio of reduced Ti.

From the data obtained in Examples 10 to 25 and Comparative Example 5, a relationship between the ratio of reduced Ti and haze value was determined. The results thereof are shown in FIG. 6.

Example 29

Figure 7:
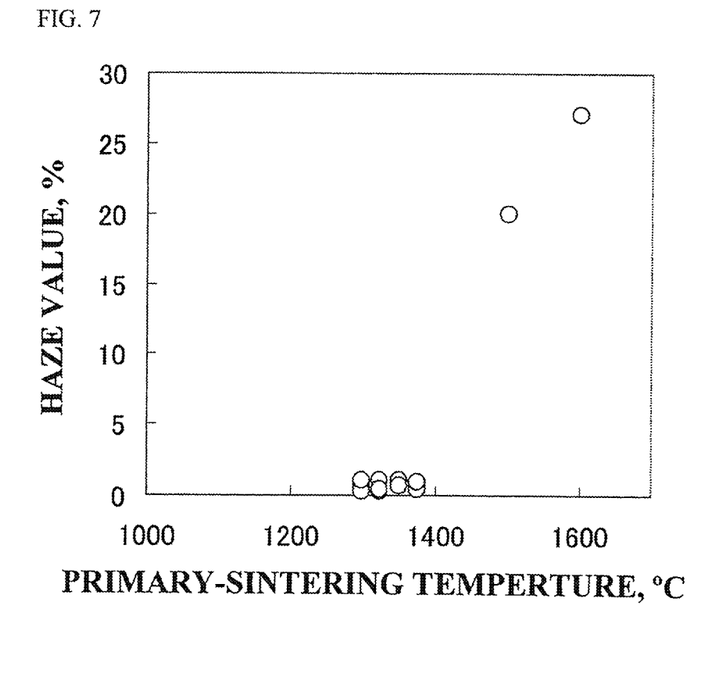
FIG. 7 is a graph showing a relationship between haze value and primary-sintering temperature.

From the data obtained in Examples 10 to 25 and Comparative Example 6, a relationship between primary-sintering temperature and haze value was determined. The results thereof are shown in FIG. 7.

Comparative Example 8

A zirconia sintered body was obtained in accordance with patent document 2. A zirconia powder containing 7 mol % yttria and 10 mol % titania was obtained in accordance with the Powder Production Examples 8-13 of patent document 2, and was sintered at 1,700° C. in an oxygen stream in accordance with the Sintering Example A and then subjected to HIP at 1,500° C. and 100 MPa. After the HIP, the ratio of reduced Ti was 18%.

The zirconia sintered body obtained had an in-line transmission of 65% and a haze value of 9%, and had lower transparency than the zirconia sintered bodies of the invention.

This is thought to be because intragranular pores were formed due to the high primary-sintering temperature and because sintering was not accelerated due to the low ratio of reduced Ti.

Comparative Example 9

A zirconia sintered body was obtained in accordance with the method described in patent document 1. In accordance with the Example 1 of patent document 1, a zirconia powder containing 8 mol % yttria (TZ-8Y, manufactured by Tosoh Corp.) was subjected to primary sintering at 1,375° C. and to HIP at 1,750° C. and 150 MPa in a semi-closed alumina vessel. The sintered body obtained had an in-line transmission of 72.5%, a haze value of 2.5%, and a diffusion coefficient of 0.251 $cm^{-1}$, and was a dimmed (cloudy) sintered body.

While the invention has been described in detail and with reference to specific embodiments thereof, it will be apparent to one skilled in the art that various changes and modifications can be made therein without departing from the spirit and scope thereof.

This application is based on a Japanese patent application filed on Jun. 4, 2009 (Application No. 2009-134741) and a Japanese patent application filed on Oct. 16, 2009 (Application No. 2009-239627), the contents thereof being incorporated herein by reference.

INDUSTRIAL APPLICABILITY

Since the zirconia sintered body of the invention has high translucency and excellent mechanical strength, the sintered body can be utilized as ornaments. For example, the zirconia sintered body of the invention can be utilized as parts for watches, decorative members, exterior parts for electronic appliances, such as transparent panel substrates for cell phones or electronic appliances, aesthetic dental parts, and the like.

In the case where the zirconia sintered body of the invention is a sintered body having especially high translucency, this sintered body can give an optical lens or optical prism that has a refractive index as high as 2.0 or above, which is not attainable with glasses. Furthermore, this sintered body has excellent mechanical properties and is hence utilizable also as decorative parts. For example, the sintered body can be used as exterior parts for watches or electronic appliances, e.g., cell phones.

Therefore, the invention has a significant industrial value.

The invention claimed is:

1. A zirconia sintered body comprising yttria in an amount of 6-15 mol % and titania in an amount of 3-20 mol %, the zirconia sintered body having an average grain size of less than 30 μm, an in-line transmission of 50% or higher when examined at a sample thickness of 1 mm and a measuring wavelength of 600 nm, a total forward transmission of 71.9% or higher when examined at a sample thickness of 1 mm and a measuring wavelength of 600 nm, a sinter density of 99.9% or higher, and a crystalline phase, the crystalline phase having a cubic fluorite structure.

2. The zirconia sintered body as claimed in claim 1 having an average bending strength of 250 MPa or higher.

3. An optical part which comprises the zirconia sintered body as claimed in claim 1.

4. The optical part as claimed in claim 3 which comprises an optical lens.

5. An exterior part for electronic appliances which comprises the zirconia sintered body as claimed in claim 1.

* * * * *